United States Patent
Ohtomo et al.

(10) Patent No.: US 10,141,602 B2
(45) Date of Patent: Nov. 27, 2018

(54) LITHIUM SOLID BATTERY, LITHIUM SOLID BATTERY MODULE, AND PRODUCING METHOD FOR LITHIUM SOLID BATTERY

(71) Applicant: TOYOTA JIDOSHA KABUSHIKI KAISHA, Toyota-shi, Aichi-ken (JP)

(72) Inventors: Takamasa Ohtomo, Susono (JP); Hisatsugu Yamasaki, Gotenba (JP); Hiroshi Nagase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 15/106,172

(22) PCT Filed: Dec. 11, 2014

(86) PCT No.: PCT/JP2014/082874
§ 371 (c)(1),
(2) Date: Jun. 17, 2016

(87) PCT Pub. No.: WO2015/098551
PCT Pub. Date: Jul. 2, 2015

(65) Prior Publication Data
US 2016/0351952 A1     Dec. 1, 2016

(30) Foreign Application Priority Data
Dec. 26, 2013   (JP) ................. 2013-269067

(51) Int. Cl.
*H01M 10/0525* (2010.01)
*H01M 10/0562* (2010.01)
(Continued)

(52) U.S. Cl.
CPC .......... *H01M 10/0562* (2013.01); *H01B 1/10* (2013.01); *H01M 10/0413* (2013.01);
(Continued)

(58) Field of Classification Search
CPC ......... H01M 10/0562; H01M 10/0525; H01M 10/058; H01M 10/04; H01M 10/0413; H01M 10/0436
See application file for complete search history.

(56) References Cited

U.S. PATENT DOCUMENTS

2009/0011338 A1   1/2009   Kimura
2013/0164631 A1*  6/2013   Ohtomo ........... H01M 10/0525
                                                     429/319
(Continued)

FOREIGN PATENT DOCUMENTS

CN    101517815 A    8/2009
JP    2008-091328 A  4/2008
(Continued)

Primary Examiner — Karie O'Neill Apicella
(74) Attorney, Agent, or Firm — Oliff PLC

(57) ABSTRACT

A problem of the present invention is to provide a lithium solid battery in which generation of short-circuits caused by dendrite is inhibited. The present invention solves the problem by providing a lithium solid battery comprising a solid electrolyte layer having a sulfide glass containing an ion conductor which has a Li element, a P element and a S element, and having an average pore radius calculated by mercury press-in method being 0.0057 µm or less.

12 Claims, 9 Drawing Sheets

(51) Int. Cl.
*H01M 10/058* (2010.01)
*H01M 10/04* (2006.01)
*H01B 1/10* (2006.01)

(52) U.S. Cl.
CPC ..... *H01M 10/0436* (2013.01); *H01M 10/058* (2013.01); *H01M 10/0525* (2013.01); *H01M 2300/008* (2013.01); *Y02T 10/7011* (2013.01)

(56) References Cited

U.S. PATENT DOCUMENTS

2013/0295469 A1\* 11/2013 Liang ................... H01M 4/134
                                                                                       429/335
2014/0082931 A1\* 3/2014 Nishino .............. H01M 2/1673
                                                                                       29/623.4

FOREIGN PATENT DOCUMENTS

| | | |
|---|---|---|
| JP | 2008-123954 A | 5/2008 |
| JP | 2009-218005 A | 9/2009 |
| JP | 2009-301959 A | 12/2009 |
| JP | 2012-048973 A | 3/2012 |
| JP | 2012-069248 A | 4/2012 |
| JP | 2012-094437 A | 5/2012 |
| JP | 2013-089470 A | 5/2013 |
| KR | 2013-0042580 A | 4/2013 |
| WO | 2008/059717 A1 | 5/2008 |
| WO | 2012/026238 A1 | 3/2012 |
| WO | 2012/164723 A1 | 12/2012 |

\* cited by examiner

FIG. 14A  Example 2
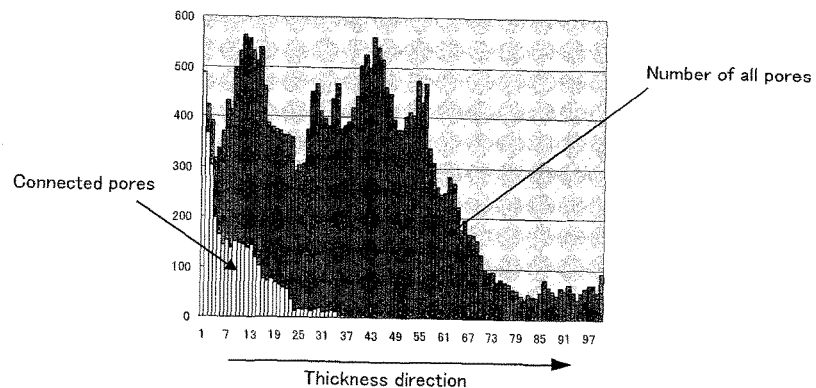
FIG. 14B  Comparative Example 2
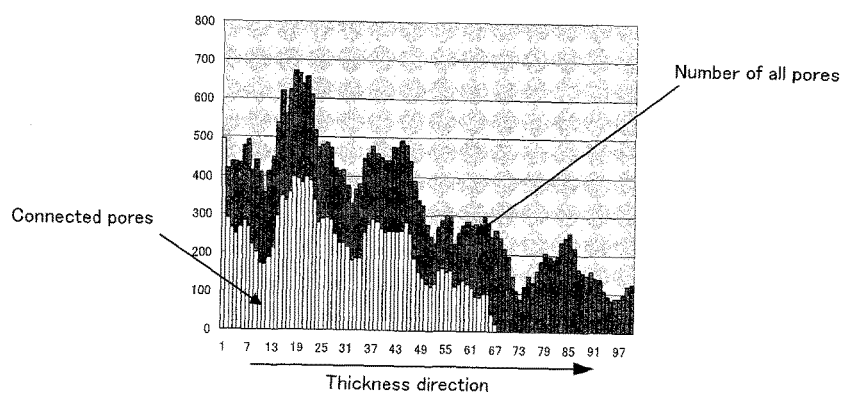
FIG. 14C  Comparative Example 3
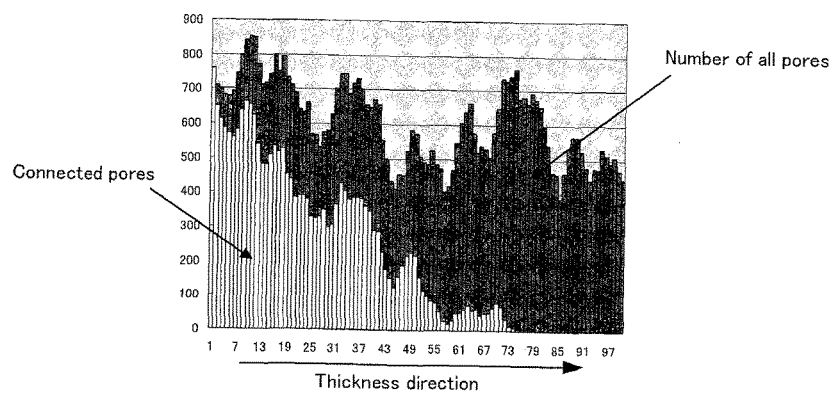

LITHIUM SOLID BATTERY, LITHIUM SOLID BATTERY MODULE, AND PRODUCING METHOD FOR LITHIUM SOLID BATTERY

TECHNICAL FIELD

The present invention relates to a lithium solid battery in which generation of short circuits caused by dendrite is inhibited.

BACKGROUND ART

In accordance with a rapid spread of information relevant apparatuses and communication apparatuses such as a personal computer, a video camera and a portable telephone in recent years, the development of a battery to be used as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the structure for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

Also, generation of short circuits caused by dendrite is known in the field of lithium battery. A short circuit is caused when Li deposited in an anode active material layer at the time of charging grows to the direction of a cathode active material layer and thus the anode active material layer and the cathode active material layer physically contact with each other. Several studies have been conducted to prevent a short circuit. For example, in Patent Literature 1, a producing method for a nonaqueous electrolyte battery comprising a step of forming a first solid layer by heating powder of amorphous solid electrolyte material, and a step of forming a second solid layer on the first solid layer by vapor phase method is disclosed. On the other hand, in Patent Literature 2, $Li_2S$—$P_2S_5$—LiI based sulfide solid electrolyte material is disclosed.

CITATION LIST

Patent Literatures

Patent Literature 1: Japanese Patent Application Publication (JP-A) No. 2013-089470
Patent Literature 2: JP-A 2012-048973

SUMMARY OF INVENTION

Technical Problem

Inhibiting generation of short circuits caused by dendrite is demanded. The present invention is made in a nod to the circumstances and a main object thereof is to provide a lithium solid battery in which generation of short circuits caused by dendrite is inhibited.

Solution to Problem

In order to solve the above-mentioned problem, the present invention provides a lithium solid battery comprising a solid electrolyte material layer having a sulfide glass containing an ion conductor which has a Li element, a P element and a S element, and having an average pore radius calculated by mercury press-in method being 0.0057 μm or less.

According to the present invention, a solid electrolyte layer having the specific sulfide glass is provided and the average pore radius of the solid electrolyte layer is the specific value or less so that the lithium solid battery in which generation of short circuits caused by dendrite is inhibited may be formed.

In the above-mentioned invention, the sulfide glass has the ion conductor and LiI; the ion conductor has $PS_4^{3-}$ structure, and a proportion of the $PS_4^{3-}$ structure to all anion structures of the ion conductor is 50 mol % or more; and a proportion of the LiI is preferably within a range of 20 mol to 30 mol %.

In the above-mentioned invention, an average pore area of the solid electrolyte layer to a plane 100 μm² vertical to a thickness direction is preferably 7.30 μm² or less.

In the above-mentioned invention, a pore disconnected distance in the solid electrolyte layer is preferably 3 μm or more.

In the above-mentioned invention, a pore connected length in the thickness direction in the solid electrolyte layer is preferably 3.7 μm or less.

In the above-mentioned invention, the lithium solid battery preferably comprises a cathode active material layer containing a cathode active material, an anode active material layer containing an anode active material, and the solid electrolyte layer formed between the cathode active material layer and the anode active material layer.

In the above-mentioned invention, the lithium solid battery preferably comprises an anode current collector, the solid electrolyte layer, the cathode active material layer and a cathode current collector in this order; and the solid electrolyte layer is preferably provided on the surface of the anode current collector.

In the above-mentioned invention, the lithium solid battery preferably comprises an anode current collector, the solid electrolyte layer, the cathode active material layer and a cathode current collector in this order; and an anode active material layer as Li metal deposited on a surface of the solid electrolyte layer side of the anode current collector is preferably provided with the battery.

Also, the present invention provides a lithium solid battery module comprising the lithium solid battery described above and a restraining member which applies restraining pressure to the lithium solid battery in the thickness direction.

According to the present invention, usage of the lithium solid battery described above allows a lithium solid battery module in which generation of short circuits caused by dendrite is inhibited.

Also, the present invention provides a producing method for a lithium solid battery comprising a step of a solid electrolyte layer forming step of forming a solid electrolyte layer by pressing a sulfide glass containing an ion conductor which has a Li element, a P element and a S element, wherein an average pore radius of the solid electrolyte layer calculated by mercury press-in method is 0.0057 μm or less.

According to the present invention, a lithium solid battery in which generation of short circuits caused by dendrite is inhibited can be obtained by forming a solid electrolyte layer using the specific sulfide glass and setting the average pore radius to be the specific value or less.

Advantageous Effects of Invention

The lithium solid battery of the present invention exhibits an effect that can inhibit generation of short circuits caused by dendrite.

BRIEF DESCRIPTION OF DRAWINGS

FIGS. 13A-1 to 13C-2 are cross-sectional views and perspective views illustrating the pore connectivity.

FIGS. 14A to 14C are graphs showing the proportion of the connected pores to all pores.

DESCRIPTION OF EMBODIMENTS

A lithium solid battery, a lithium solid battery module and a producing method for a lithium solid battery of the present invention are hereinafter explained in detail.

A. Lithium Solid Battery

Figure 1:
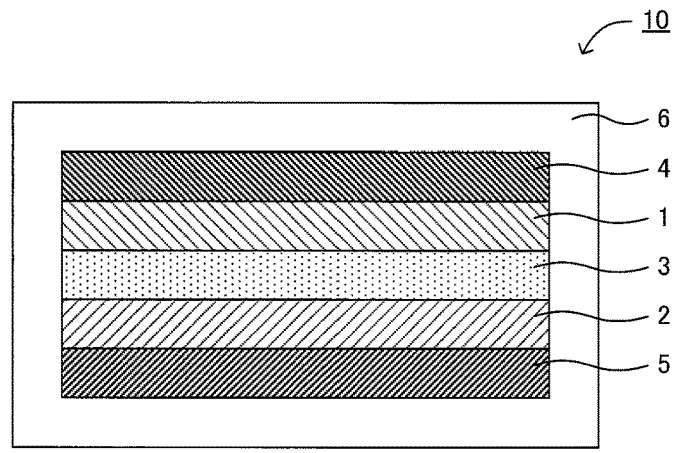
FIG. 1 is a schematic cross-sectional view illustrating an example of a lithium solid battery of the present invention.

First, a lithium solid battery of the present invention is explained. FIG. 1 is a schematic cross-sectional view showing an example of a lithium solid battery of the present invention. The lithium solid battery 10 in FIG. 1 comprises a cathode active material layer 1 containing a cathode active material, an anode active material layer 2 containing an anode active material, a solid electrolyte layer 3 formed between the cathode active material layer 1 and the anode active material layer 2, a cathode current collector 4 for collecting currents of the cathode active material layer 1, an anode current collector 5 for collecting currents of the anode active material layer 2, and a battery case 6 for storing these members. The present invention features the configurations that the solid electrolyte layer 3 contains the specific sulfide glass and the average pore radius is the specific value or less.

Figure 2A:
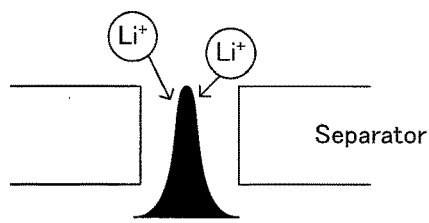
FIGS. 2A to 2C are pattern diagrams describing growth of dendrite.

According to the present invention, a solid electrolyte layer having the specific sulfide glass is provided and the average pore radius of the solid electrolyte layer is the specific value or less so that the lithium solid battery in which generation of short circuits caused by dendrite is inhibited may be formed. Here, in Cited Literature 1, a producing method for a nonaqueous electrolyte battery for the purpose of preventing short circuits is disclosed, but the mechanism of growth and restraint of dendrite in a battery using liquid electrolyte completely differs from the mechanism in a battery using a solid electrolyte layer. Specifically, as shown in FIG. 2A, in a battery using liquid electrolyte, dendrite consistently contacts with liquid electrolyte and Li is continuously supplied from the liquid electrolyte, thus dendrite continuously grows. Also, in a battery using liquid electrolyte, deposited lithium metal is reacted with the liquid electrolyte and SEI is produced on the surface. Accordingly, it is considered that growth of dendrite may be inhibited by making the pore in the separator small to reduce the size of deposited lithium, and by actively making SEI produced on the surface of lithium so as to become nonconductive.

Figure 2B:
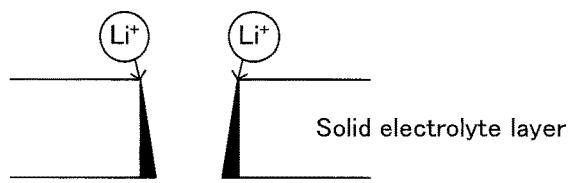
Figure 2C:
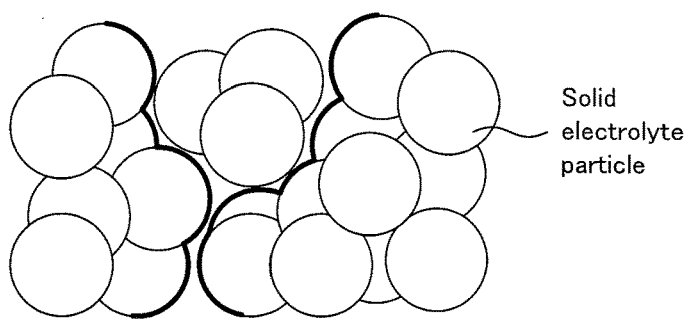

On the contrary, as shown in FIG. 2B, in a battery using a solid electrolyte layer, dendrite grows as like crawling the surface of the solid electrolyte particle. It is considered that lithium metal grows more easily in a battery using a solid electrolyte layer constituted with a solid electrolyte material stable to lithium metal compared with a battery using liquid electrolyte because the deposited lithium remains active in a battery using a solid electrolyte layer. Thus, in a battery using a solid electrolyte layer, it is considered that the pore should be made smaller so that lithium metal cannot grow, or the cross-section area of the deposited lithium should be made smaller so that the electron conductivity of the lithium metal becomes smaller than the ion conductivity of the solid electrolyte material, and thus control of the pore in the solid electrolyte layer is much more difficult than the case of using liquid electrolyte. Incidentally, in the case of using a solid electrolyte material unstable to the lithium metal, there are problems such that the lithium metal cannot be discharged due to irreversible reaction and the ion conductivity of the solid electrolyte material is deteriorated. In this manner, the mechanism of growth and restraint of dendrite in a battery using liquid electrolyte completely differs from the mechanism in a battery using a solid electrolyte layer. Further, as shown in FIG. 2C, in an actual solid electrolyte layer, the solid electrolyte particle is disposed in three dimensions and a path of dendrite growth is also complicated.

Also, the average pore radius provided in the present invention is significantly small and greatly exceeds the level of the size which may be easily obtained by pressing the arbitrary sulfide glass with high pressure. In other words, not only the condition for pressing but also characteristics as a material for the sulfide glass is also important in order to obtain the desired average pore radius in the present invention. Conventionally, knowledge with regard to the formability of a sulfide glass (ease of pore crush, range of plastic deformation) is not known and there is no such indicator whatsoever. Also, if the formability of the sulfide glass is bad, obtaining the desired average pore radius is difficult even by pressing with no matter how high pressure. To this matter, in the present invention, it is found that the sulfide glass having a Li element, a P element and a S element has favorable formability, and generation of short circuits caused by dendrite is actually inhibited by setting the average pore radius to be the specific value or less. The reason why generation of short circuits is inhibited is considered that the pore size of the solid electrolyte layer is smaller than the size of the edge portion of dendrite.

The lithium solid battery of the present invention is hereinafter explained in each constitution.

1. Solid Electrolyte Layer

A solid electrolyte layer in the present invention is formed between a cathode active material layer and an anode active material layer, and has a specific sulfide glass. Also, in the present invention, the average pore radius of the solid electrolyte layer calculated by mercury press-in method is, usually 0.0057 µm or less, preferably 0.0054 µm or less, and more preferably 0.0051 µm or less. The average pore radius of the solid electrolyte layer is calculated by mercury press-in method. Specifically, as described in the later described Examples, the average pore radius may be measured from the pore distribution curve by using a pore distribution measurement apparatus.

(1) Sulfide Glass

A sulfide glass in the present invention is one of sulfide solid electrolyte materials and has an ion conductor having a Li element, a P element and a S element. Also, the sulfide glass in the present invention refers to an amorphous body in a broad sense. Accordingly, as the result of amorphization, a material such that a part of a raw material (such as later described LiI) is remained and a peak is observed in X-ray diffraction is included in the sulfide glass in the present invention. Above all, it is preferable that a peak is not observed in X-ray diffraction in the sulfide glass of the present invention.

An ion conductor in the present invention is usually constituted with Li cation and an anion structure including P and S. Above all, the ion conductor in the present invention preferably contains $PS_4^{3-}$ structure as a main body of the anion structure (50 mol % or more). Above all, the proportion of $PS_4^{3-}$ structure to all anion structures of the ion conductor is, preferably 60 mol % or more, more preferably 70 mol % or more, further more preferably 80 mol % or more, and particularly preferably 90 mol % or more. Incidentally, the proportion of the $PS_4^{3-}$ structure may be defined by methods such as Raman spectroscopy, NMR, and XPS.

Also, the sulfide glass in the present invention usually has the ion conductor as the main body. The proportion of the ion conductor in the sulfide glass is preferably 65 mol % or more, more preferably 70 mol % or more, and further more preferably 75 mol % or more. Also, the sulfide glass may be constituted with only the ion conductor or may contain other components. Examples of other components include LiI. The sulfide glass has the ion conductor and LiI so that the formability (ease of pore crush) is improved and the solid electrolyte layer with smaller average pore radius may be obtained. LiI is usually present in the state of being incorporated in the structure of the ion conductor. More specifically, LiI is considered to be dispersed microscopically (in the condition not physically capable of being separated) around the anion structure of the ion conductor (such as $PS_4^{3-}$).

The proportion of LiI is 5 mol % or more for example, preferably 10 mol % or more, and more preferably 20 mol % or more. On the other hand, the proportion of LiI is 35 mol % or less for example, and preferably 30 mol % or less. Especially, in the present invention, the sulfide glass preferably has the composition of xLiI·(100−x) (yLi$_2$S·(1−y) P$_2$S$_5$) (20≤x≤30, 0.7≤y≤0.8). Incidentally, "y" is preferably 0.72 or more, and more preferably 0.74 or more. Also, "y" is preferably 0.78 or less, and more preferably 0.76 or less.

The sulfide glass in the present invention preferably does not contain Li$_2$S substantially. The reason therefor is to allow the sulfide glass with less hydrogen sulfide generation amount. Li$_2$S generates hydrogen sulfide by reacting with water. For example, Li$_2$S easily remains when the proportion of Li$_2$S contained in a raw material composition is large. "Not substantially containing Li$_2$S" may be confirmed by X-ray diffraction. Specifically, it is possible to estimate that Li$_2$S is not substantially contained in the case of not having a peak of Li$_2$S (2θ=27.0°, 31.2°, 44.8°, and 53.1°).

The sulfide glass in the present invention preferably does not contain crosslinking sulfur substantially. The reason therefor is to allow the sulfide glass with less hydrogen sulfide generation amount. "Crosslinking sulfur" refers to crosslinking sulfur in a chemical compound formed by the reaction of Li$_2$S with sulfide of P. For example, crosslinking sulfide of S$_3$P—S—PS$_3$ structure formed by the reaction of Li$_2$S with P$_2$S$_5$ falls within the scope. Such crosslinking sulfur easily reacts with water and generates hydrogen sulfide. Further, "not substantially containing crosslinking sulfur" may be confirmed by the measurement of Raman spectroscopy spectrum. For example, a peak of S$_3$P—S—PS$_3$ structure usually appears at 402 cm$^{-1}$. Accordingly, it is not preferable that this peak is observed. Also, a peak of PS$_4^{3-}$ structure usually appears at 417 cm$^{-1}$. In the present invention, the intensity I$_{402}$ at 402 cm$^{-1}$ is preferably smaller than the intensity I$_{417}$ at 417 cm$^{-1}$. More specifically, the intensity I$_{402}$ to the intensity I$_{417}$ is preferably 70% or less for example, more preferably 50% or less, and furthermore preferably 35% or less.

The sulfide glass in the present invention is preferably such that formed by amorphizing a raw material composition containing Li$_2$S, a sulfide of P (phosphorus), and LiI. Li$_2$S preferably has fewer impurities. The reason therefor is to inhibit the side reaction. On the other hand, examples of the sulfide of P (phosphorus) may include P$_2$S$_3$ and P$_2$S$_5$. Incidentally, simple substance of P and simple substance of S may be used instead of the sulfide of P (phosphorus). Also, examples of the method for amorphization include a mechanical milling method and melt quenching method. Examples of mechanical milling may include a ball mill, a vibration mill, a turbo mill, a mechano-fusion and a disc mill. Also, the mechanical milling may be a dry mechanical milling or a wet mechanical milling, but the latter is preferable. The reason therefor is to obtain the sulfide glass with high uniformity.

In the case that the raw material composition contains Li$_2$S and P$_2$S$_5$, the proportion in which an ortho composition is stoichiometrically obtained is Li$_2$S:P$_2$S$_5$=75:25 in terms of mole. Here, ortho generally refers to the oxyacid with the highest hydration degree among oxyacids obtained by hydrating a same oxide. In the present invention, the crystal composition in which Li$_2$S is most added in sulfide is referred as the ortho composition. For example, Li$_3$PS$_4$ falls under the ortho composition in Li$_2$S—P$_2$S$_5$ series. In the case the raw material composition contains Li$_2$S and P$_2$S$_5$, the proportion of Li$_2$S to the total of Li$_2$S and P$_2$S$_5$ is preferably within a range of 70 mol % to 80 mol %, more preferably within a range of 72 mol % to 78 mol %, and further more preferably within a range of 74 mol % to 76 mol %.

The sulfide glass in the present invention preferably has a glass transition point. The reason therefor is because Li ion conductivity is further improved by making the noncrystallinity high so as to have a glass transition point. Presence or absence of a glass transition point may be confirmed by a differential thermal analysis (DTA).

Examples of the shape of the sulfide glass in the present invention may include a granular shape. The average particle diameter ($D_{50}$) of the sulfide glass is 0.01 μm or more for example, and preferably 0.1 μm or more. On the other hand, the average particle diameter ($D_{50}$) of the sulfide glass is 50 μm or less for example, and preferably 30 μm or less. Also, the sulfide glass in the present invention preferably has high Li ion conductivity, and the Li ion conductance at normal temperature (25° C.) is preferably $1\times10^{-4}$ S/cm or more for example, and more preferably $1\times10^{-3}$ S/cm or more.

(2) Solid Electrolyte Layer

A solid electrolyte layer in the present invention is featured that the average pore radius calculated by mercury press-in method is within the above-mentioned range. On the other hand, the pore distribution in the solid electrolyte layer of the present invention may be also evaluated by cross-section observation using FIB-SEM (focused ion beam/scanning electron microscope). Specifically, the average pore area, the pore disconnected distance and the pore connected length below may be measured thereby.

The average pore area of the solid electrolyte layer in the present invention to a plain 100 μm² vertical to the thickness direction is preferably small. The reason therefor is to further inhibit generation of short circuits. The average pore area is preferably less than 7.61 μm² for example, and more preferably 7.30 μm² or less. Especially, the average pore area is preferably within the above-mentioned range in the observation area in which the surface of the anode active material layer side of the solid electrolyte layer becomes the end surface.

The pore disconnected distance in the solid electrolyte layer of the present invention is preferably large. The reason therefor is to further inhibit generation of short circuits. Here, the area in which the pore area rate is 0.05% or less is defined as a pore disconnected area, and the length of the pore disconnected area in the thickness direction is defined as the pore disconnected distance. The pore disconnected distance is preferably more than 2 and more preferably 3 μm or more. Especially, the pore disconnected distance in which the surface of the anode active material layer side of the solid electrolyte layer is set as a starting point is preferably within the above-mentioned range.

In the solid electrolyte layer of the present invention, it is preferable that the pore connected length in the thickness direction is short. The reason therefor is to further inhibit generation of short circuits. The pore connected length is preferably less than 6.8 μm for example, and more preferably 3.7 μm or less. Especially, the pore connected length in which the surface of the anode active material layer side of the solid electrolyte layer is set as a starting point is preferably within the above-mentioned range.

Also, the number of all pores in the plane 100 μm² vertical to the thickness direction is preferably 100 pieces or less in the surface of the anode active material layer side of the solid electrolyte layer.

The solid electrolyte layer in the present invention may be constituted with only the above-mentioned sulfide glass or may contain other components. Examples of the other components include a later described binding material. The proportion of the sulfide glass contained in the solid electrolyte layer is 50% by volume or more for example, preferably 60% by volume or more, more preferably 70% by volume or more, further more preferably 80% by volume or more, and particularly preferably 90% by volume or more. Also, the thickness of the solid electrolyte layer is within a range of 0.1 μm to 1000 μm for example, and preferably within a range of 0.1 μm to 300 μm.

2. Anode Active Material Layer

An anode active material layer in the present invention is a layer containing at least an anode active material, and may contain at least one of a solid electrolyte material, a conductive material and a binding material as required.

The anode active material is not particularly limited if dendrite is possibly generated therewith at the time of charging. On the other hand, whether dendrite is actually generated or not is greatly affected by the current density at the time of charging. For example, dendrite is generated in many cases when the current density at the time of charging is set to be significantly large. Also, in the case which Li insertion potential of the anode active material is low, dendrite is easily generated at the time of charging. The Li insertion potential of the anode active material is preferably 1.5 V (vs Li/Li⁺) or less for example, and more preferably 0.5V (vs Li/Li⁺) or less. Incidentally, the Li insertion potential of the anode active material is measured by cyclic voltammetry for example.

Examples of the anode active material may include metal lithium; lithium alloys such as a lithium aluminum alloy, a lithium tin alloy, a lithium lead alloy, and a lithium silicon alloy; metal oxides such as tin oxide, silicon oxide, lithium titanium oxide, niobium oxide, and tungsten oxide; metal sulfides such as tin sulfide and titanium sulfide; metal nitrides such as lithium cobalt nitride, lithium iron nitride, and lithium manganese nitride; and carbon materials such as graphite.

The anode active material layer may contain a solid electrolyte material. The use of a solid electrolyte material allows the ion conductivity of the anode active material layer to be improved. The kinds of the solid electrolyte material are not particularly limited, but the examples thereof may include a sulfide solid electrolyte material. Examples of the sulfide solid electrolyte material may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m, n is a positive number; Z is either one of Ge, Zn, and Ga), $Li_2S$—$GeS_2$, $Li_2S$—$SiS_2$—$Li_3PO_4$, $Li_2S$—$SiS_2$-$Li_xMO_y$ (provided that x, y is a positive number; M is either one of P, Si, Ge, B, Al, Ga, and In), and $Li_{10}GeP_2S_{12}$. The solid electrolyte material may be amorphous, crystalline, or glass ceramics. Also, the solid electrolyte material to be used for the anode active material layer may be the sulfide glass described above.

The anode active material layer may further contain a conductive material. Addition of a conductive material allows the conductivity of the anode active material layer to be improved. Examples of the conductive material may include acetylene black, Ketjen black, and carbon fiber. Also, the anode active material layer may contain a binding material. Examples of the kind of the binding material may include binding materials containing fluoride such as polyvinylidene fluoride (PVDF). Also, the thickness of the anode active material layer is preferably within a range of 0.1 μm to 1000 μm for example.

3. Cathode Active Material Layer

The cathode active material layer in the present invention is a layer containing at least a cathode active material, and may contain at least one of the solid electrolyte material, the conductive material and the binding material as required. Examples of the cathode active material may include oxide active materials; specifically, rock salt bed type active materials such as $LiCoO_2$, $LiMnO_2$, $LiNiO_2$, $LiVO_2$, $LiNi_{1/3}Co_{1/3}Mn_{1/3}O_2$, spinel type active materials such as $LiMn_2O_4$ and $Li(Ni_{0.5}Mn_{1.5})O_4$, and olivine type active materials such as $LiFePO_4$, $LiMnPO_4$, $LiNiPO_4$, and $LiCuPO_4$. Also, Si containing oxides such as $Li_2FeSiO_4$ and $Li_2MnSiO_4$ may be used as the cathode active material. Also, the surface of the cathode active material may be coated with a coating layer. The reason therefor is to inhibit the reaction of the cathode active material with the solid electrolyte material. Examples of the material for the coating layer may include Li ion conductive oxides such as $LiNbO_3$.

Incidentally, the solid electrolyte material, the conductive material, and the binding material to be used for the cathode active material layer are the same as in the case of the anode active material layer described above. Also, the thickness of the cathode active material layer is preferably within a range of 0.1 μm to 1000 μm for example.

4. Other Constitutions

The lithium solid battery of the present invention comprises at least the above described solid electrolyte layer, anode active material layer and cathode active material layer. Further, the lithium solid battery usually has a cathode current collector for collecting currents of the cathode active material layer and an anode current collector for collecting currents of the anode active material layer. Examples of the material for the cathode current collector may include SUS, aluminum, nickel, iron, titanium and carbon. On the other hand, examples of the material for the anode current collector may include SUS, copper, nickel and carbon. The thickness and the shape of the cathode current collector and the anode current collector are preferably selected properly in accordance with factors such as the uses of the battery. Also, a battery case for a general battery may be used for the battery case in the present invention. Examples of the battery case may include a battery case made of SUS.

5. Lithium Solid Battery

The lithium solid battery of the present invention may be a primary battery or a secondary battery, but preferably a secondary battery among them. The reason therefor is to be repeatedly charged and discharged and be useful as a car-mounted battery, for example. Examples of the shape of the lithium solid battery of the present invention may include a coin shape, a laminate shape, a cylindrical shape and a rectangular shape. Also, the lithium solid battery of the present invention can inhibit generation of the short circuits caused by dendrite, thus the battery is suitable for high-rate charging. The lithium solid battery of the present invention may have a charge control portion to control the charging rate. The charging rate is preferably 1 C or more for example, more preferably 3 C or more, and further more preferably 5 C or more.

The lithium solid battery of the present invention is not particularly limited if the battery has the above described solid electrolyte layer. Examples of the constitution of the lithium solid battery may include, as shown in above-described FIG. 1, the constitution comprising the cathode active material layer 1 containing the cathode active material, the anode active material layer 2 containing the anode active material, and the solid electrolyte layer 3 formed between the cathode active material layer 1 and the anode active material layer 2.

Figure 3:
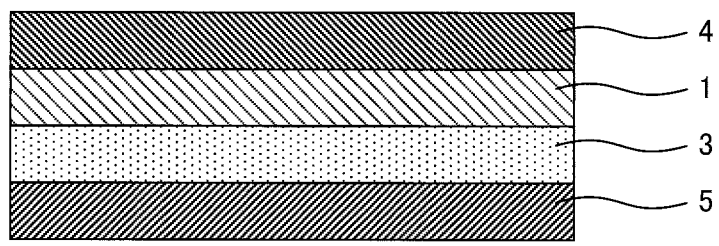
FIG. 3 is a schematic cross-sectional view illustrating another example of a lithium solid battery of the present invention.

On the other hand, the lithium solid battery of the present invention may be a battery in which the anode active material layer is not set at the time of the assembly, but Li metal as the anode active material is deposited at the time of charging after the assembly. Examples of the constitution of such lithium solid battery may include the constitution comprising the anode current collector 5, the solid electrolyte layer 3, the cathode active material layer 1 and the cathode current collector 4 in this order, and providing the solid electrolyte layer 3 on the surface of the anode current collector 5 as shown in FIG. 3. There is a particular problem that short circuits due to dendrite are more easily generated in the lithium solid battery in which the anode active material is not set at the time of the assembly compared to the lithium solid battery in which the anode active material layer is set at the time of the assembly, as shown in FIG. 3. In the case of charging the lithium solid battery in which the anode active material layer is set at the time of the assembly, Li is inserted inside the anode active material (such as carbon), so usually, Li deposit does not immediately occur on the surface of the anode active material. On the contrary, in the case of not setting the anode active material layer at the time of the assembly, Li deposit occurs on the surface of the anode current collector at the time of charging, thus short circuits due to dendrite are remarkably easily generated.

Short circuits due to dendrite may be effectively inhibited by using the solid electrolyte layer described above as the solid electrolyte layer for such lithium solid battery. Also, such lithium solid battery does not have an anode active material layer at the stage before charging (at the time of assembly of a battery), but Li metal as the anode active material is deposited/self-formed by using Li contained in the cathode active material layer at the time of charging. Accordingly, the battery is advantageous in the view points of the volume and the weight compared to the case in which the anode active material layer is set in advance, and has an advantage that the high energy density of a battery can be achieved. In addition, the battery also has an advantage that the amount of Li metal to be used for the battery can be minimized.

Figure 4:
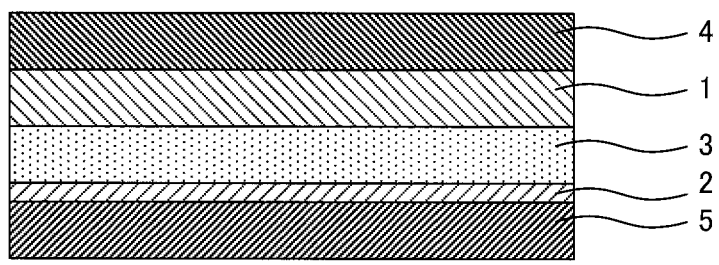
FIG. 4 is a schematic cross-sectional view illustrating another example of a lithium solid battery of the present invention.

Also, the constitution of the lithium solid battery of the present invention may be a constitution as shown in FIG. 4 for example, which comprises the anode current collector 5, the solid electrolyte layer 3, the cathode active material layer 1 and the cathode current collector 4 in this order, and the anode active material layer 2 as Li metal deposited on the surface of the solid electrolyte layer 3 side of the anode current collector 5 is provided with. Incidentally, the lithium solid battery shown in FIG. 4 is equivalent to the charged state of the lithium solid battery with the constitution shown in FIG. 3.

Deposit of Li metal on the surface of the anode current collector may be confirmed by observing the interfaces of the both. A field emission type scanning electron microscope (FE-SEM) may be used for example to observe the interfaces. For example, in the case Li metal is disposed in advance, the Li metal uniformly exists in a dense state. On the other hand, in the case Li metal is deposited, the Li metal exists in the shape that follows the surface of the solid electrolyte layer in a not so dense state. Also, the surface of the deposited Li metal may become fibrous (approximately 100 nm diameter) in some cases.

The thickness of the Li metal to be deposited on the surface of the anode current collector is not particularly limited, but changes in accordance with the state of charge. The maximum thickness of the Li metal is 50 μm or less for example, preferably 30 μm or less, and more preferably 20 μm or less. Incidentally, the maximum thickness of the Li metal may be calculated to be the average thickness in the most charged state.

Also, in the lithium solid battery shown in FIG. 4, the Li metal to be deposited at the time of charging is used as the anode active material. Accordingly, the amount of Li in the whole battery is usually equal to the amount of Li in the cathode active material layer and the solid electrolyte layer. Also, if electrochemical reactions such as oxidation reduction decomposition reaction do not occur in the solid electrolyte layer, the amount of Li in the solid electrolyte layer is constant, thus the amount decreased from the cathode active material layer at the time of charging corresponds to the amount of Li deposited on the anode current collector at the time of charging. Also, the cathode active material does not contain Li in some cases when the battery is charged completely.

B. Lithium Solid Battery Module

Figure 5:
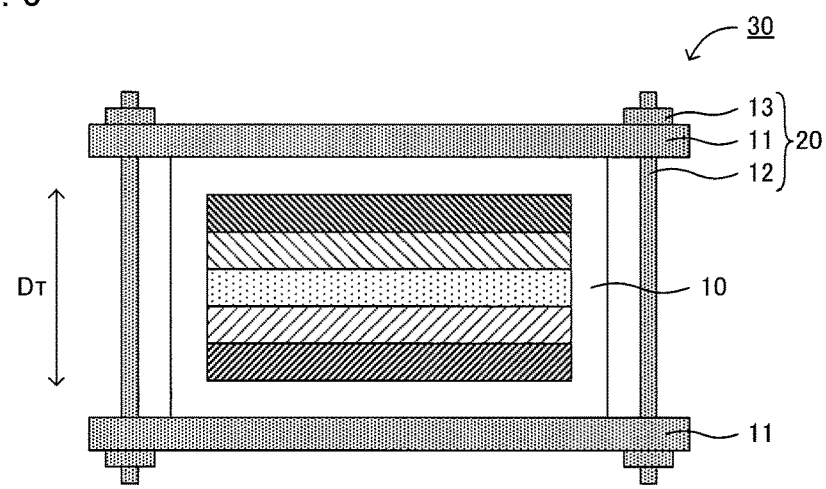
FIG. 5 is a schematic cross-sectional view illustrating an example of a lithium solid battery module of the present invention.

Next, a lithium solid battery module of the present invention is explained. FIG. 5 is a schematic cross-sectional view illustrating an example of the lithium solid battery module of the present invention. The lithium solid battery module 30 in FIG. 5 comprises a lithium solid battery 10 and a restraining member 20 which applies restraining pressure to the lithium solid battery 10 in a thickness direction $D_T$. Also, the restraining member 20 has a plate shape portion 12 for nipping the both surfaces of the lithium solid battery 10, a stick shape portion 11 for connecting two plate shape portions 12, and an adjusting portion 13 which is connected to the stick shape portion 11 so as to adjust the restraining pressure by the structures such as a screw structure. Incidentally, an insulating treatment may be conducted for the restraining member as required so that the cathode and the anode do not short circuit.

According to the present invention, using the lithium solid battery described above allows the lithium solid battery module in which generation of short circuits caused by dendrite is inhibited.

The lithium solid battery in the present invention is in the same contents described in "A. Lithium solid battery" above, so the description herein is omitted. Also, the restraining member in the present invention is not particularly limited if the restraining member can apply the restraining pressure to the lithium solid battery in the thickness direction, and a general restraining member may be used. The restraining pressure (surface pressure) in the present invention is not particularly limited, but is 0.1 MPa or more for example, and preferably 1 MPa or more. There is an advantage in increasing the restraining pressure that the contacts of particles such as the contact of the active material particle with the electrolyte particle are easily maintained. On the other hand, the restraining pressure (surface pressure) is 100 MPa or less for example, and preferably 50 MPa or less. This is because the restraining member requires high rigidity and thus the module possibly becomes large in size if the restraining pressure is too high.

C. Producing Method for Lithium Solid Battery

Figure 6A:
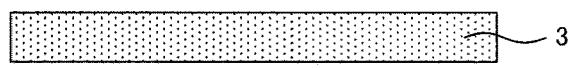
FIGS. 6A to 6D are schematic cross-sectional views illustrating an example of a producing method for a lithium solid battery of the present invention.
Figure 6B:
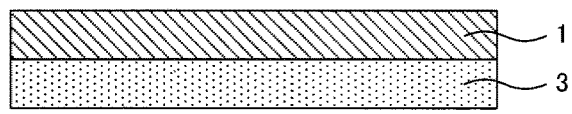
Figure 6C:
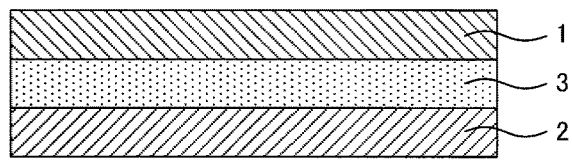
Figure 6D:
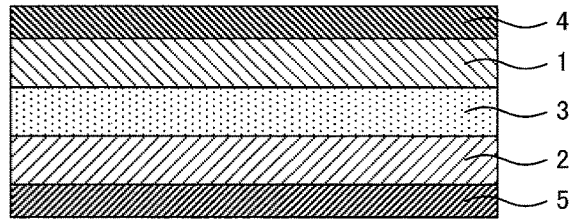

Next, a producing method for a lithium solid battery of the present invention is explained. FIG. 6 is a schematic cross-sectional view illustrating an example of the producing method for a lithium solid battery of the present invention. In FIG. 6, first, a sulfide glass having the composition of 30LiI.70(0.75Li$_2$S.0.25P$_2$S$_5$) is pressed to form a solid electrolyte layer 3 (FIG. 6A). Next, a cathode material containing the cathode active material is disposed on one side surface of the solid electrolyte layer 3 and then pressed to form a cathode active material layer 1 (FIG. 6B). Next, an anode material containing the anode active material is disposed on the other side surface of the solid electrolyte layer and then pressed to form an anode active material layer 2 (FIG. 6C). Next, a cathode current collector 4 and an anode current collector 5 are respectively disposed on the surface of the cathode active material layer 1 and the anode active material layer 2 (FIG. 6D). A lithium solid battery is obtained by storing the obtained laminated body (not shown in figures) in a battery case. In the present invention, the average pore radius in the solid electrolyte layer measured by mercury press-in method is set to be predetermined value or less. The number of times for the pressing in producing the lithium solid battery may be once or several times, but usually several times. The average pore radius of the solid electrolyte layer is set to be the predetermined value or less by the several time pressing.

According to the present invention, the solid electrolyte layer is formed by using the specific sulfide glass and then the average pore radius is set to be the predetermined value or less so that the lithium solid battery in which generation of short circuits caused by dendrite is inhibited may be obtained.

The producing method for the lithium solid battery of the present invention is hereinafter described in each step.

1. Solid Electrolyte Layer Forming Step

A solid electrolyte layer forming step in the present invention is a step to form the solid electrolyte layer by pressing a sulfide glass containing an ion conductor which has a Li element, a P element and a S element.

The sulfide glass, and the solid electrolyte layer to be obtained in this step are in the same contents described in "A. Lithium solid battery" above, so the description herein is omitted. Also, the method for the pressing is not particularly limited, but the examples may include a plate press and a roll press. Also, the maximum pressure to be applied to the solid electrolyte layer in the present invention is more than 588 MPa for example, preferably 600 MPa or more, more preferably 650 MPa or more, further more preferably 700 MPa or more, and particularly preferably 750 MPa or more. On the other hand, the maximum pressure to be applied to the solid electrolyte layer is 1000 MPa or less for example, and preferably 800 MPa or less. Incidentally, "the maximum pressure to be applied to the solid electrolyte layer" refers to the highest pressure among not only the pressures to be applied in the solid electrolyte layer forming process but also the pressures to be applied to the solid electrolyte layer in each step to be described later.

2. Other Steps

The present invention may include a cathode active material layer forming step to form the cathode active material layer by using a cathode material containing the cathode active material and an anode active material layer forming step to form the anode active material layer by using an anode material containing the anode active material, other than the solid electrolyte layer forming step. Styles of the cathode material and the anode material are not particularly limited as long as the desired active material layer is obtained by the material, but the examples may include a composite, a thin layer, and a sintered body.

Also, the order of the solid electrolyte layer forming step, the cathode active material layer forming step and the anode active material layer forming step is not particularly limited if it is capable of obtaining the desired lithium solid battery by the order, and the arbitrary order may be used. Also, the solid electrolyte layer forming step and the cathode active material layer forming step may be conducted at the same time, and the solid electrolyte layer forming step and the anode active material layer forming step may be conducted at the same time. Further, the solid electrolyte layer forming step, the cathode active material layer forming step and the anode active material layer forming step may be conducted at the same time. Also, the pressing may be conducted in the state which at least one of the cathode current collector and the anode current collector is disposed.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is explained in more details by showing examples hereinafter.

Example 1

Synthesis of Sulfide Glass

Lithium sulfide ($Li_2S$, 99.9% purity, manufactured by Nippon Chemical Industrial Co., Ltd.), phosphorus pentasulfide ($P_2S_5$, 99.9% purity, manufactured by Sigma-Aldrich Co. LLC.), and lithium iodide (LiI, 99.9% purity, manufactured by Sigma-Aldrich Co. LLC.) were used as starting raw materials. Next, $Li_2S$, $P_2S_5$ and LiI were mixed in an Ar atmosphere glove box (dew point: −70° C.) at the composition ratio of $20LiI.80(0.75Li_2S.0.25P_2S_5)$. The weight of 2 g of this mixture was put in a pot of a planetary ball mill (45 cc, made of $ZrO_2$) together with dehydrated heptane (moisture amount 30 ppm or less, 4 g) and $ZrO_2$ ball ($\phi$=5 mm, 53 g) to hermetically seal the pot completely (Ar atmosphere). This pot was mounted on a planetary ball milling machine (P7™ manufactured by Fritsch Japan Co., Ltd.) to perform mechanical milling for 1 hour treatment and 15 minutes pause as a set at the number of weighing table revolutions of 500 rpm 40 sets. After that, the obtained test sample was dried on a hot plate so as to remove heptane and obtain a sulfide glass ($20LiI.80(0.75Li_2S.0.25P_2S_5)$, $D_{50}$=25 μm). This sulfide glass is regarded as the sulfide glass A. Also, a sulfide glass ($30LiI.70(0.75Li_2S.0.25P_2S_5)$, $D_{50}$=25 μm) was obtained in the same manner. This sulfide glass is regarded as the sulfide glass B.

(Formation of Evaluation Batteries)

First, a cathode active material ($LiNi_{1/3}Co_{1/3}Mn_{1/3}O_2$, three dimensional layer shape active material, $D_{50}$=4 μm to 6 μm, manufactured by Nichia Corporation) was prepared. A coating layer (average thickness 10 nm) constituted with $LiNbO_3$ was formed on the surface of this cathode active material by using a tumbling fluidized bed coating apparatus (manufactured by Powrex Corp.). The cathode active material in which the coating layer was formed, the sulfide glass B and the conductive material (VGCF) were mixed at the weight ratio of the cathode active material:the sulfide glass B:the conductive material=73:24:3 to obtain a cathode mixture.

After that, 80 mg of the sulfide glass A was added to a cylinder made of macole and pressed at 98 MPa to form a solid electrolyte layer. Next, 17.8 mg of the cathode mixture was added on the solid electrolyte layer and pressed at 785 MPa to form a cathode active material layer. Next, both sides of the obtained pellet were pinched with pistons made of SUS and confined with a bolt to obtain an evaluation battery (torque=6 Ncm, surface pressure=44 MPa). Incidentally, an anode active material layer is not used in this evaluation battery, but Li metal is deposited in a self-forming manner on the surface of SUS at the time of charging.

Example 2

An evaluation battery was obtained in the same manner as in Example 1 except that the sulfide glass to be used for the solid electrolyte layer was changed to the sulfide glass B ($30LiI.70(0.75Li_2S.0.25P_2S_5)$).

Comparative Example 1

A sulfide glass ($75Li_2S.25P_2S_5$) was obtained in the same manner as in Example 1 except that LiI was not used. This sulfide glass is regarded as the sulfide glass C. An evaluation battery was obtained in the same manner as in Example 1 except that the sulfide glass to be used for the solid electrolyte layer was changed to the sulfide glass C ($75Li_2S.25P_2S_5$).

Comparative Example 2

An evaluation battery was obtained in the same manner as in Example 2 except that the pressure at the time of forming the cathode active material layer was changed to 588 MPa.

Comparative Example 3

An evaluation battery was obtained in the same manner as in Example 2 except that the pressure at the time of forming the cathode active material layer was changed to 392 MPa.

Comparative Example 4

An evaluation battery was obtained in the same manner as in Example 2 except that the pressure at the time of forming the cathode active material layer was changed to 196 MPa.

[Evaluation]

(Pore Distribution Measurement by Mercury Press-in Method)

The sulfide glasses A to C were pressed respectively to form solid electrolyte layers, and the pore distribution in the solid electrolyte layers were measured by mercury press-in method. Incidentally, the forming pressure was set to be equal to the maximum pressure applied in Examples 1, 2 and Comparative Examples 1 to 4. The measurement was conducted by using a pore distribution measurement apparatus (AutoPore IV9520™ manufactured by Micrometrics Instrument Corporation) in a simple glove bag, in which the atmosphere was replaced to dried Ar atmosphere. The pore radius was calculated by using Washburn formula and the average pore radius was measured from the obtained pore distribution curve.

Washburn formula: $PD = -4\sigma \cos\theta$ (P=pressure, D=pore diameter, σ=surface tension of mercury, θ=contact angle of mercury with test sample)

Figure 7:
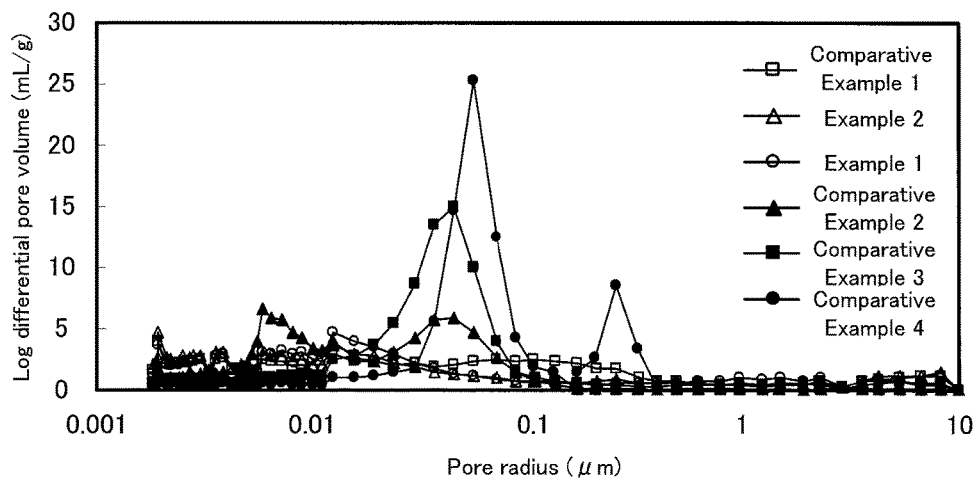
FIG. 7 is a graph showing the pore radius of the solid electrolyte layer in Examples 1, 2 and Comparative Examples 1 to 4.
Figure 8:
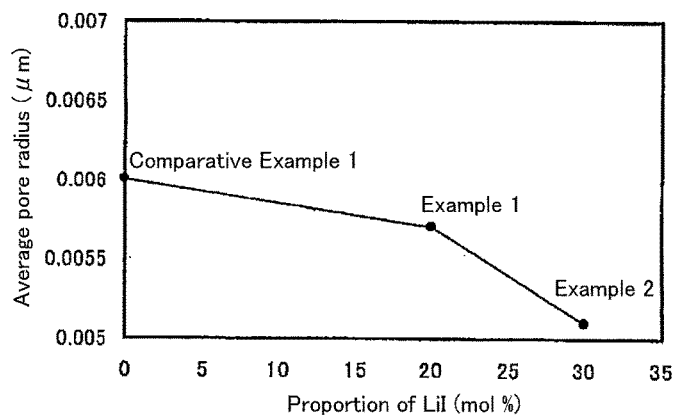
FIG. 8 is a graph showing the relation between the proportion of LiI and the average pore radius.

The results were shown in FIG. 7, FIG. 8 and Table 1. As shown in FIG. 7, FIG. 8 and Table 1, it was confirmed from the results of Examples 1, 2 and Comparative Example 1 that the more the proportion of LiI became, the smaller the average pore radius became. From this finding, it was suggested that the more the proportion of LiI was, the more the formability improved. Also, from the results of Example 2 and Comparative Examples 2 to 4, it was confirmed that the larger the forming pressure was, the smaller the average pore radius became.

(Charging and Discharging Measurement)

A charging and discharging measurement was conducted by using the evaluation batteries obtained in Examples 1, 2 and Comparative Examples 1 to 4. The measurement conditions were: 25° C., electric density 0.2 mAh/cm² (equivalent to 0.1 C), 3.0 V to 4.1 V, CC charge and discharge. Charging does not finish in the case inside short circuit occurs, thus charging was quit in 20 hours and the battery was discharged in that case. Incidentally, presence or absence of inside short circuit was judged by presence or absence of plunge in voltage at the time of charging. Also, the coulomb efficiency was calculated with regard to the charge and discharge capacity.

Figure 9:
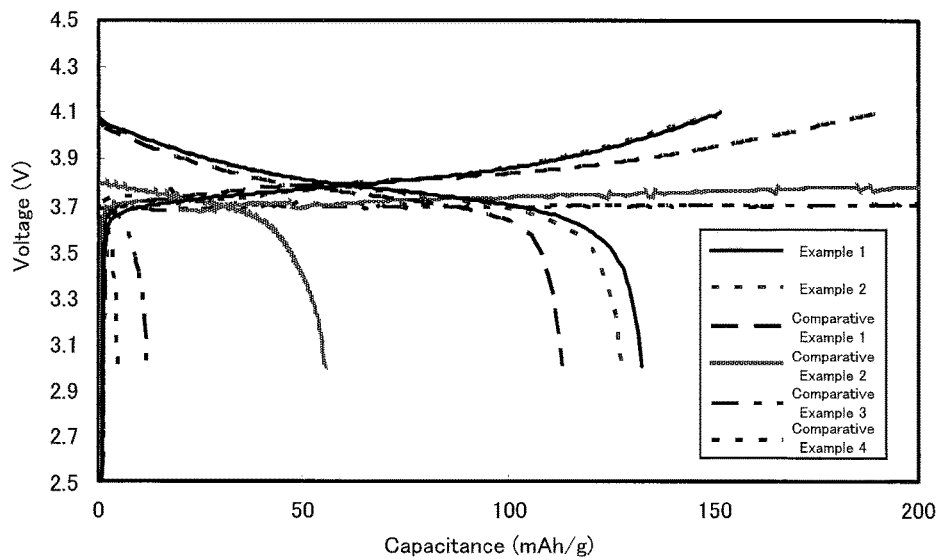
FIG. 9 is the result of charge and discharge measurement for evaluation batteries obtained in Examples 1, 2 and Comparative Examples 1 to 4.
Figure 10:
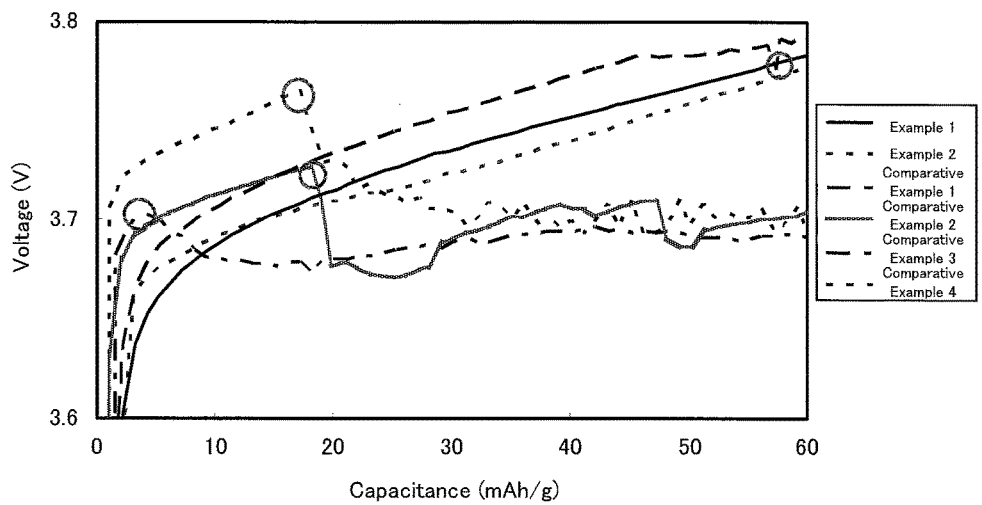
FIG. 10 is an enlarged view of FIG. 9.

The results are shown in FIG. 9, FIG. 10 and Table 1. Incidentally, FIG. 10 is an enlarged view of FIG. 9. As shown in FIG. 10, plunge in voltage during charging was observed in Comparative Examples 1 to 4, and it was suggested that short circuits caused by dendrite was generated. On the other hand, as shown in FIG. 9, in Examples 1 and 2, short circuit did not occur during charging, and the charge capacitance of approximately 150 mAh/g and the discharge capacitance of approximately 130 mAh/g were obtained. Also, in Comparative Examples 1 to 4 in which short circuit occurred, smaller discharge capacitance was shown compared with Examples 1 and 2. Also, as shown in Table 1, high coulomb efficiency of 85% or more was shown in Examples 1 and 2. On the other hand, in Comparative Examples 1 to 4 in which short circuit occurred, charging was quit in 20 hours, which is twice of the charging time of Examples 1 and 2, and the battery was discharged, but only low coulomb efficiency was shown, and it was confirmed that loss in charged electric amount was large.

TABLE 1

| | Proportion x of LiI (mol %) | Forming pressure (MPa) | Average pore radius (μm) | Presence of short-circuit | Coulomb efficiency (%) |
| --- | --- | --- | --- | --- | --- |
| Comparative Example 1 | 0 | 785 | 0.0060 | Present | 59 |
| Example 1 | 20 | 785 | 0.0057 | Absent | 87 |
| Example 2 | 30 | 785 | 0.0051 | Absent | 85 |
| Comparative Example 2 | 30 | 588 | 0.0074 | Present | 16 |
| Comparative Example 3 | 30 | 392 | 0.0125 | Present | 3 |
| Comparative Example 4 | 30 | 196 | 0.0229 | Present | 1 |

(Pore Distribution Measurement by Cross Section Observation)

Figure 11:
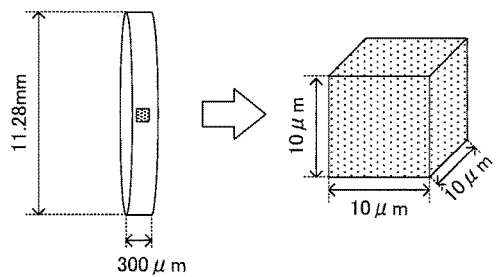
FIG. 11 is an explanatory view describing the observation area in FIG-SEM measurement.

The sulfide glasses B were respectively pressed to form the solid electrolyte layers, and the pore distribution in the solid electrolyte layers was measured by cross-section observation using FIB-SEM. Incidentally, the forming pressure was set to be equal to the maximum pressure applied in Example 2 and Comparative Examples 2 to 4. For the measurement, a focused ion/electron beam processing observation system (nanoDUE'T™ NB5000 manufactured by Hitachi High-Technologies Corporation) was used. First, a protective film (tungsten vapor deposition film) was deposited on the surface of the test sample in dried Ar atmosphere, and secondly, the area around the observation area as shown in FIG. 11 (a cube with a side length of approximately 10 vim) was removed by FIB processing, and then observed by auto processing mode. Specifically, the cube was sliced into 100 pieces along the depth direction (in the thickness direction of the solid electrolyte layer) and the image analysis was conducted for the surface of the each piece. Incidentally, the resolution was approximately 1 nm.

Figure 12A:
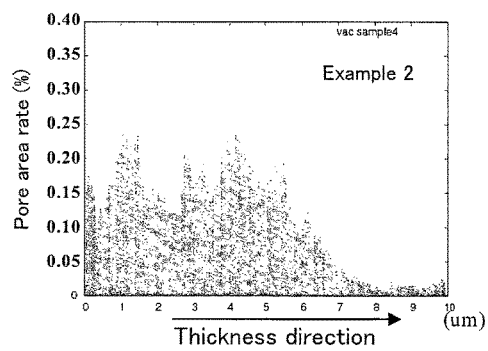
FIGS. 12A to 12D are graphs showing the pore area rate in the thickness direction of the solid electrolyte layer.
Figure 12C:
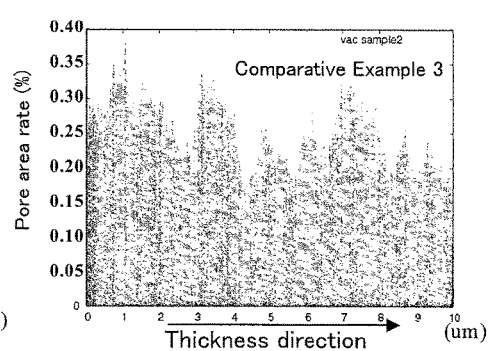
Figure 12B:
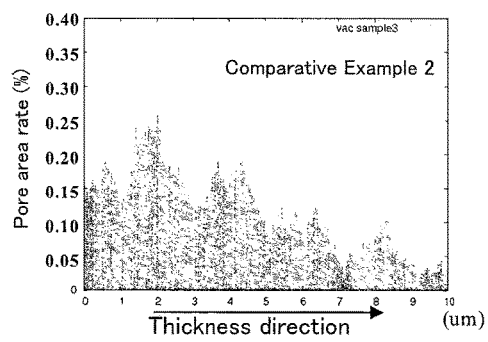
Figure 12D:
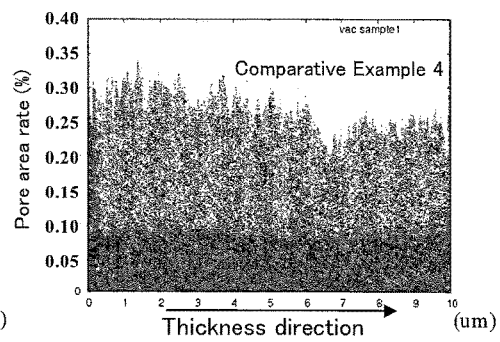

The pore area rate in the thickness direction of the solid electrolyte layer obtained by the image analysis is shown in FIGS. 12A to 12D. As shown in FIGS. 12A to 12C, it was confirmed that generation of short circuits was inhibited for the reason that the larger the forming pressure became, the smaller the pore area rate became. Also, the average pore area to a plane 100 μm² vertical to a thickness direction is shown in Table 2. As shown in Table 2, in the case the average pore area to the plane 100 μm² was 7.3 μm² or less, generation of short circuits caused by dendrite was inhibited. Further, in the case the area in which the pore area rate became 0.05% or less was defined as the pore disconnected area and the length of the pore disconnected area in the thickness direction was defined as the pore disconnected distance, as shown in Table 2, generation of short circuits caused by dendrite was inhibited in the case the pore disconnected distance was 3 μm or more.

Figures 1, 13A:
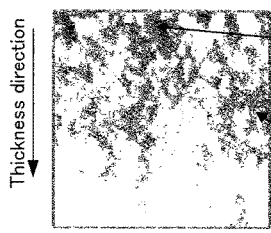
Figures 2, 13A:
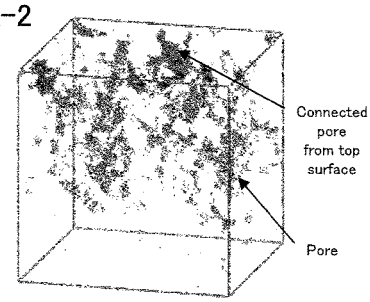
Figures 1, 13B:
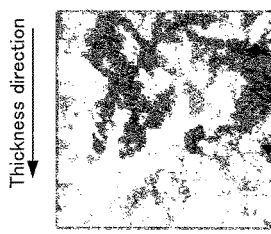
Figures 2, 13B:
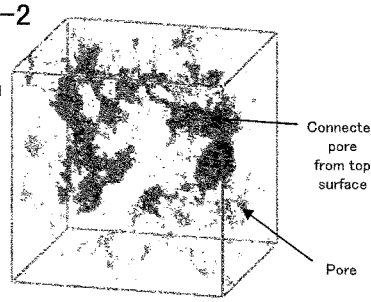
Figures 1, 13C:
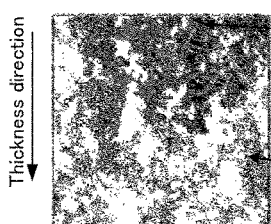
Figures 2, 13C:
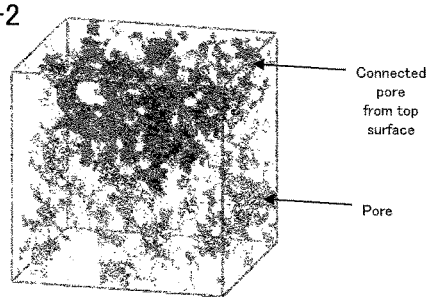
Figure 15:
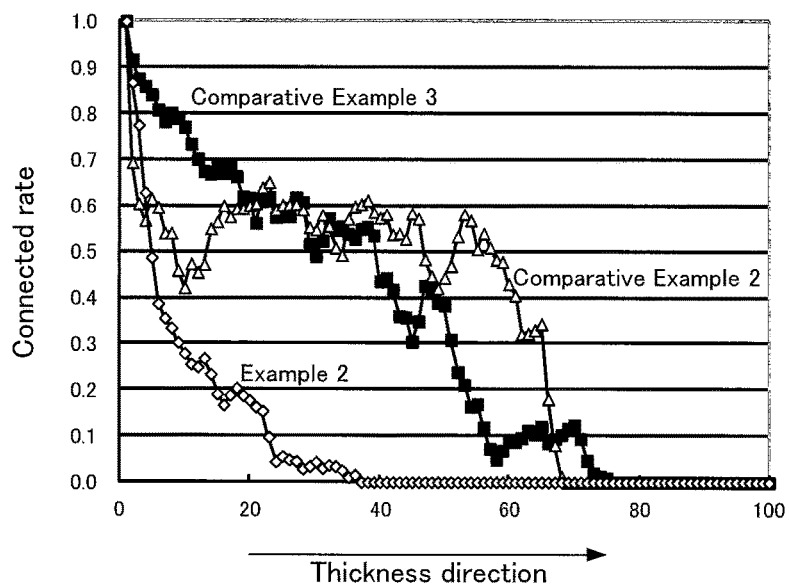
FIG. 15 is a graph showing the proportion of the connected pores to all pores.

Also, the proportion of the connected pores which were connected from the top surface of the observation area and the proportion of the other pores were evaluated from the image analysis result. The results are shown in FIGS. 13A-1 to 15. FIGS. 13A-1 to 13C-2 are cross-sectional views and perspective views illustrating the pore connectivity. Incidentally, FIGS. 13A-1 and 13A-2 are the results of Example 2, FIGS. 13B-1 and 13B-2 are the results of Comparative Example 2, and FIGS. 13C-1 and 13C-2 are the results of Comparative Example 3. FIGS. 14A to 15 are the graphs showing the proportion of the connected pores to all pores. The pore connected length in the thickness direction was calculated from these results. The results are shown in FIG. 16 and Table 2.

TABLE 2

| | Proportion x of LiI (mol %) | Forming pressure (MPa) | Average pore area (μm²/ 100 μm²) | Pore connected distance (μm) | Pore disconnected length in thickness direction (μm) |
| --- | --- | --- | --- | --- | --- |
| Example 2 | 30 | 785 | 7.30 | 3 | 3.762 |
| Comparative Example 2 | 30 | 588 | 7.61 | 2 | 6.832 |
| Comparative Example 3 | 30 | 392 | 16.11 | 0 | 7.524 |
| Comparative Example 4 | 30 | 196 | 19.79 | 0 | not measured |

Figure 16:
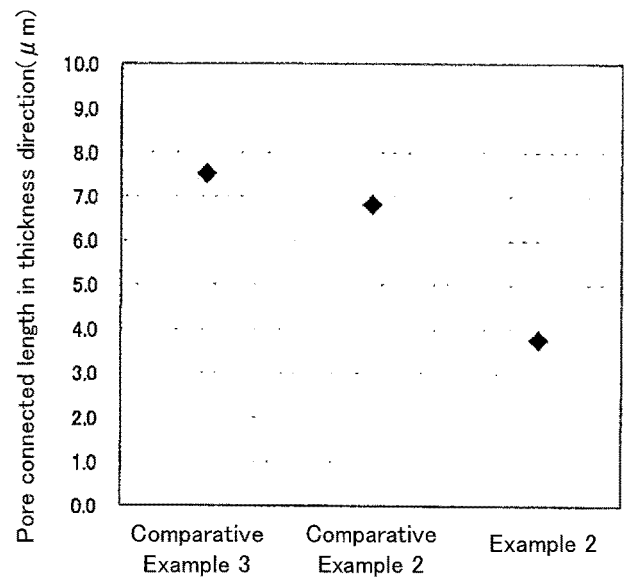
FIG. 16 is a graph showing the pore connected length in the thickness direction of the solid electrolyte layer.

As shown in FIG. 16 and Table 2, the higher the forming pressure became, the smaller the pore connected length became and thus generation of short circuits caused by dendrite was inhibited.

REFERENCE SIGNS LIST 1 cathode active material layer
2 anode active material layer
3 solid electrolyte layer
4 cathode current collector
5 anode current collector
6 battery case
10 lithium solid battery
20 restraining member
30 lithium solid battery module

What is claimed is:
1. A lithium solid battery comprising:
a solid electrolyte layer comprising:
  a sulfide glass comprising:
    an ion conductor that comprises a Li element, a P element and a S element, wherein
the solid electrolyte layer has an average pore radius calculated by mercury press-in method of 0.0057 μm or less.

2. The lithium solid battery according to claim 1 wherein the sulfide glass comprises the ion conductor and LiI,
the ion conductor comprises $PS_4^{3-}$ structure, and a proportion of the $PS_4^{3-}$ structure to all anion structures of the ion conductor is 50 mol % or more, and
a proportion of the LiI is within a range of 20 mol % to 30 mol %.

3. The lithium solid battery according to claim 1 wherein an average pore area of the solid electrolyte layer to a plane 100 µm² vertical to a thickness direction is 7.30 µm² or less.

4. The lithium solid battery according to claim 1 wherein a pore disconnected distance in the solid electrolyte layer is 3 µm or more.

5. The lithium solid battery according to claim 1 wherein a pore connected length in the thickness direction in the solid electrolyte layer is 3.7 µm or less.

6. The lithium solid battery according to claim 1 wherein the battery comprises:
a cathode active material layer comprising a cathode active material,
an anode active material layer comprising an anode active material, and
the solid electrolyte layer formed between the cathode active material layer and the anode active material layer.

7. The lithium solid battery according to claim 1 wherein the battery comprises:
an anode current collector,
the solid electrolyte layer,
the cathode active material layer, and
a cathode current collector, in this order, and
the solid electrolyte layer is provided on the surface of the anode current collector.

8. The lithium solid battery according to claim 1 wherein the battery comprises:
an anode current collector,
the solid electrolyte layer,
the cathode active material layer, and
a cathode current collector, in this order, and
a Li metal anode active material layer deposited on the solid electrolyte layer side surface of the anode current collector.

9. A lithium solid battery module comprising:
the lithium solid battery according to claim 1, and
a restraining member that applies restraining pressure to the lithium solid battery in the thickness direction.

10. A producing method for a lithium solid battery comprising:
forming a solid electrolyte layer by pressing a sulfide glass comprising an ion conductor that comprises a Li element, a P element and a S element,
wherein an average pore radius of the solid electrolyte layer calculated by mercury press-in method is 0.0057 µm or less.

11. The lithium solid battery according to claim 2, wherein the sulfide glass comprises the ion conductor and LiI, and
a proportion of the LiI is within a range of 20 mol % to 30 mol %.

12. The producing method according to claim 10, wherein the sulfide glass comprises the ion conductor and LiI, and
a proportion of the LiI is within a range of 20 mol % to 30 mol %.

* * * * *